United States Patent [19]
Verdier et al.

[11] Patent Number: 4,866,729
[45] Date of Patent: Sep. 12, 1989

[54] PROCESS AND GENERATOR FOR GENERATING ATOMIC IODINE IN THE FUNDAMENTAL STATE, AND IODINE CHEMICAL LASER EMPLOYING SUCH

[75] Inventors: Claude Verdier, Neauphle Le Chateau; Bruno Leporcq, Paris; Eric Georges, Buc; Roger Barraud, Longjumeau, all of France

[73] Assignee: Office National d'Etudes et de Recherches Aerospatiales, France

[21] Appl. No.: 182,282

[22] Filed: Mar. 10, 1988

Related U.S. Application Data

[63] Continuation-in-part of Ser. No. 13,780, Feb. 12, 1987.

[51] Int. Cl.⁴ .............................................. H01S 3/095
[52] U.S. Cl. ......................................... 372/89; 372/90
[58] Field of Search ................. 372/58, 59, 77, 89-90, 372/39, 55

[56] References Cited

U.S. PATENT DOCUMENTS

| | | | |
|---|---|---|---|
| 3,928,821 | 3/1983 | Gregg | 372/89 |
| 4,488,311 | 12/1984 | Davis et al. | 372/89 |

FOREIGN PATENT DOCUMENTS 2298205  8/1976  France .

OTHER PUBLICATIONS

Dlabal et al; "Iodine Monofluoride 140-KW Laser; Small Signal Gain and Operating Parameters"; Optics Lett. vol. 6, No. 2, Feb. 1981.
Chemical Abstract, vol. 103, No. 6, Aug. 12, 1985, p. 541, No. 45 247x.
Chemical Abstract, vol. 101, No. 2, Jul. 9, 1984, p. 449, No. 14 403z.

Primary Examiner—William L. Sikes
Assistant Examiner—B. R. R. Holloway
Attorney, Agent, or Firm—Larson and Taylor

[57] ABSTRACT

To generate atomic iodine in the fundamental state, a combustion reaction between a combustion supporter and a fuel, of which one at least is an iodine compound, are injected into a chamber. Means to enable the two products to be measured out with an excess of the iodine compound with respect to the stoichiometric proportions of the combustion and means to initiate the combustion reaction are provided.

11 Claims, 1 Drawing Sheet

U.S. Patent
Sep. 12, 1989
4,866,729
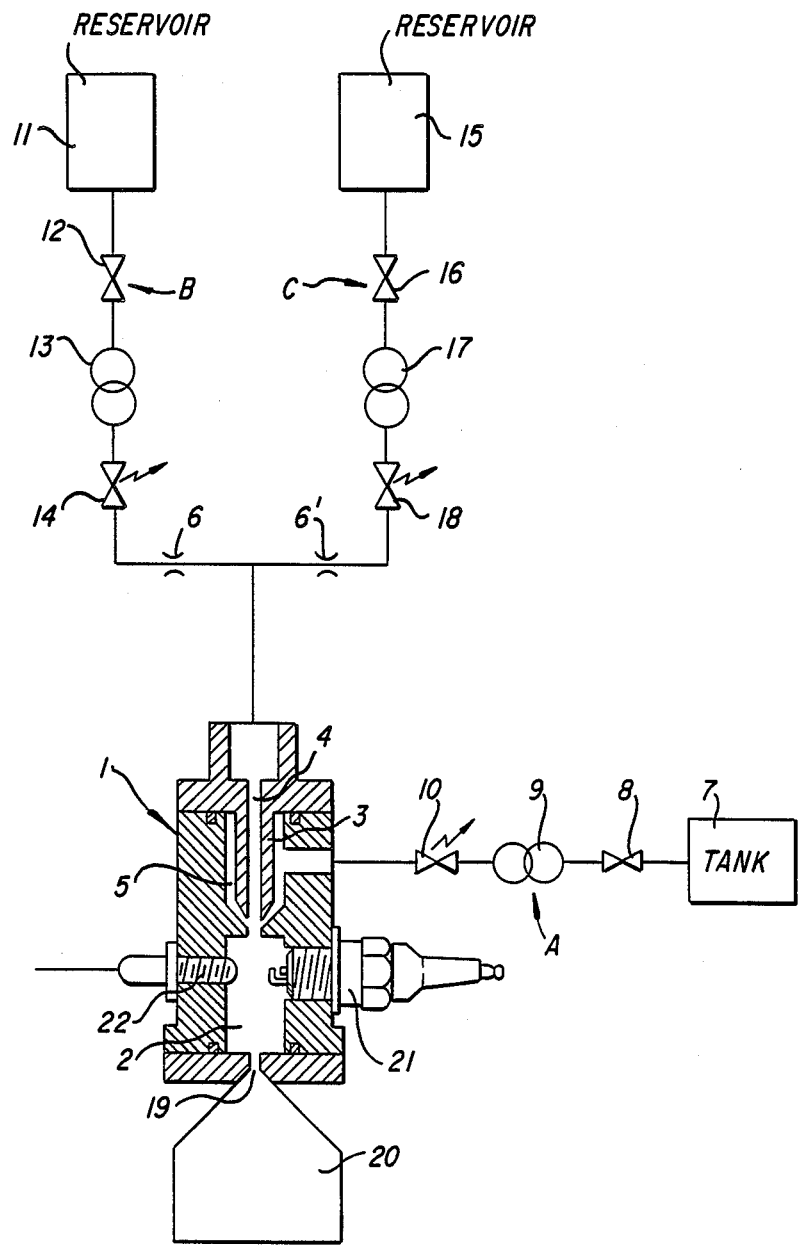

PROCESS AND GENERATOR FOR GENERATING ATOMIC IODINE IN THE FUNDAMENTAL STATE, AND IODINE CHEMICAL LASER EMPLOYING SUCH

This application is a continuation-in-part application of parent application Ser. No. 013,780, filed Feb. 12, 1987.

The present invention relates to a process and a generator for generating atomic iodine in the fundamental state, and it relates also to an iodine chemical laser employing such a process and such a generator.

Atomic iodine in the fundamental state finds employment in iodine chemical lasers. In lasers of this type known at present, the atomic iodine in the fundamental state necessary for the generation of the laser phenomenon is obtained by the transfer of electron energization from oxygen to iodine according to the following operation. Chlorine is injected under reduced pressure (some millibars) into concentrated hydrogen peroxide $H_2O_2$ (for example 85%), in a basic medium. There results the continuous production of molecular oxygen in the singlet state $O_2{}^1\Delta$, which is a metastable chemical species whose life span, under reduced pressure, is sufficient to enable its transportation in ducts. It is thus possible to conduct it first to a cryogenic trap where water coming from the evaporation of the basic solution of $H_2O_2$ is retained in part, then to an area of mixing with molecular iodine. The injection of molecular iodine into the flow of $O_2{}^1\Delta$ is accompanied by the dissociation of the molecular iodine $I_2$ into atomic iodine in the fundamental state $I_2p_{3/2}$ and the electron energization of the atomic iodine $I_2p_{3/2}$ into atomic iodine in the $I_2p_{1/2}$ state, which has the required properties to lead to a laser effect with a wavelength of $1.315\mu$.

The dissociation of the molecular iodine into fundamental atomic iodine, the excitation of the fundamental atomic iodine into energized atomic iodine and, the obtaining of the laser radiation may be shown by the following diagram:

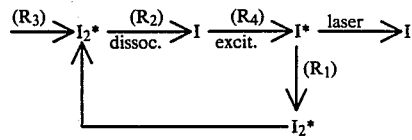

In this diagram $(R_1)$ to $(R_5)$ represent the following chemical reactions:

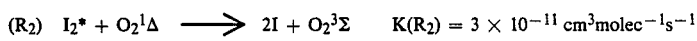

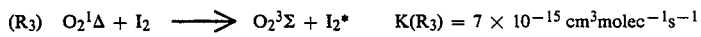

in which:

$I^*$ represents energized atomic iodine $I_2p_{1/2}$ $I^*_2$ represents a form of vibrationally energized molecular iodine, $O_2{}^3\Sigma$ represents the fundamental oxygen, $h\nu$ represents a photon with the wavelength of $1.315\mu$.

K is the velocity constant associated with the reaction concerned.

This model shows that the step of dissociation of the molecular iodine into atomic iodine is a fundamental step, caused by a slow chemical reaction $(R_3)$ which penalizes the emission of the laser radiation.

In addition, it is known that the water present in the $O_2{}^1\Delta$ is a deactivator of $I^*$ and $I_2^*$:

An important drawback of this known process is hence to necessitate the presence of cryogenic traps designed to remove, at least in large part, the water which accompanies the singlet oxygen flow $O_2{}^1\Delta$, which cryogenic traps raise the expense and increase the complexity of the invention.

Another drawback, not less important, is that the molecular iodine is a chemical species whose physical properties render the use very delicate. It is in addition very difficult to obtain high and reproducible flow rates and the inevitable presence of solid particles of iodine pollutes the laser cavity.

It is an essential object of the invention to overcome the drawbacks of the prior art and to propose an original manner of obtaining atomic iodine in the fundamental state which permits the production of iodine chemical lasers which perform much better than those produced hitherto.

Accordingly, a first aspect of the invention relates to a process for generating ground state atomic iodine in which recourse is had to a combusion reaction using a supporter of combustion, and a fuel of which one at least is an iodine compound, characterized in that:

the combustible supporter is selected from among $F_2$ and $NF_3$;

the fuel is selected from among $H\dot{I}$, $CF_3\dot{I}$, $C_3F_7\dot{I}$, $\dot{I}_2$ and $CH\dot{I}_3$;

the richness $\phi$ of the iodine compound with respect to the stoichiometric proportions is $0.5 < \phi < 2.5$ by using the combustion supporter $F_2$ and $0.6 < \phi < 2.6$ by using the combustion supporter $NF_3$;

and the said combustion reaction is made under a pressure condition between 50 torrs and 5 bars.

Advantageously, the combustion supporter and the fuel are selected as follows (in which $\phi$ is the richness and m is the ratio of the compound mass flows):

the combustion supporter is $NF_3$ and the fuel is $H\dot{I}$ with $0.6 < \phi < 2$ and $3.24 < m < 10.81$;

the combustion supporter is $NF_3$ and the fuel is $CF_3\dot{I}$ with $0.6 < \phi < 1.3$ and $4.96 < m < 10.77$;

the combustion supporter is $NF_3$ and the fuel is $C_3F_7\dot{I}$ with $0.6 < \phi < 1.3$ and $1.50 < m < 3.25$;

the combustion supporter is $NF_3$ and the fuel is $\dot{I}_2$ with $1.7 < \phi < 2.3$ and $9.12 < m < 12.34$;

the combustion supporter is $NF_3$ and the fuel is $CH\dot{I}_3$ with $0.8 < \phi < 21.2$ and $2.66 < m < 4$;

the combustion supporter is $F_2$ and the fuel is $H\dot{I}$ with $0.5 < \phi < 2.2$ and $3.36 < m < 14.82$;

the combustion supporter is $F_2$ and the fuel is $CF_3\dot{I}$ with $0.5 < \phi < 1.3$ and $5.15 < m < 13.41$;

the combustion supporter is $F_2$ and the fuel is $C_3F_7\dot{I}$ with $0.5 < \phi < 1.3$ and $1.56 < m < 4.06$;

the combustion supporter is $F_2$ and the fuel is $\dot{I}_2$ with $1.5 < \phi < 2.5$ and $10.02 < m < 16.71$;

the combustion supporter is $F_2$ and the fuel is $CH\dot{I}_3$ with $0.6 < \phi < 1.3$ and $2.49 < m < 5.39$.

A second aspect of the invention relates to a ground state atomic iodine generator which employs a combustion reaction using a combustion supporter and a fuel of which one at least is an iodine compound, characterized in that: the combustible supporter is selected from among $F_2$ and $NF_3$; the fuel is selected from among $H\dot{I}$, $CF_3\dot{I}$, $C_3F_7\dot{I}$, $\dot{I}_2$ and $CH\dot{I}_3$; the richness $\phi$ of the iodine compound with respect to the stoichiometric proportion is $0.5 < \phi < 2.5$ by using the combustible supporter $F_2$ and $0.6 < \phi < 2.6$ by using the combustible supporter $NF_3$; and the said combustion reaction is made under a pressure condition between 50 torrs and 5 bars.

In a particular embodiment, this generator comprises a combustion chamber possessing two injectors respectively for the fueld and the combustion supporter, means for measuring out the fuel and the combustion supporter with an excess of the iodine compound with respect to the stoichiometric proportions of the combustion reaction, means for initiating the combustion of the fuel-combustion supporter mixture, means for maintaining in the combustion chamber a pressure condition between 50 torrs and 5 bars, and a supersonic outlet tube to collect the reaction products among which figures the atomic iodine.

Due to the means employed according to the invention, it is now possible, due to the fact of the elimination of the production of molecular iodine difficult to obtain in sufficient amounts with high and/or regular flow rates, to generate atomic iodine in the fundamental state directly, in amounts as high as desired and with flow rates which it is easy to regulate. In addition, the cryogenic traps are eliminated necessary hitherto to reduce to the maximum the presence of water.

A third aspect of the invention relates to a particular application, of the generation of atomic iodine in the fundamental state carried out according to the invention, to an iodine chemical laser, which is characterized in that it comprises:

a combustion chamber possessing two injectors to deliver respectively a fuel and a combustion supporter, means for initiating combustion of the fuel-combustion supporter mixture, and a supersonic outlet duct to collect the products emerging from the combustion;

first means for conducting a fuel in regulatable amount and speed to one of the injectors; and second means to conduct a combustion supporter in regulatable amount and speed to the other injector; and one at least of the fuel and of the combustion supporter being an iodine compound in excess with respect to the stoichiometric proportions corresponding to the above-said combustion reaction in order that atomic iodine in the fundamental state may be present in the products emerging from the combustion, and in which: the combustible supporter is selected from among $F_2$ and $NF_3$; the fuel is selected from among $H\dot{I}$, $CF_3\dot{I}$, $C_3F_7\dot{I}$, $\dot{I}_2$ and $CH\dot{I}_3$; the richness $\phi$ of the iodine compound with respect to the stoichiometric proportons is $0.5 < \phi < 2.5$ by using the combustible supporter $F_2$ and $0.6 < \phi < 2.6$ by using the combustion supporter $NF_3$; and the said combustible reaction is made under a pressure condition between 50 torrs and 5 bars.

The employment of direct generators of atomic iodine according to the invention in replacement of the molecular iodine generators of the prior art presents very marked advantages for the production of iodine chemical lasers which perform much better.

It is in fact possible to envisage easily, iodine chemical lasers of a power of several kilowatts by reason of the suppression of the very important technological difficulties associated, among others, with the corresponding increase in the flow rate of molecular iodine (a species difficult to transport) which would be necessary in an iodine laser of the conventional type.

Cryogenic traps for the removal of water, which were indispensable in conventional lasers using molecular iodine and which heavily penalized the operational potential of these lasers, are now eliminated in the lasers with the direct production of atomic iodine according to the invention.

The disassociation step $R_2$, which consumes the singlet oxygen and which consequently limits the power, no longer exists in the process of the invention which contributes to an increase in the powers of the lasers.

Besides that, it is possible to obtain laser extraction lengths much shorter in the direction of flow, which avoids the complex employment of laser cavities with multiple passages necessary hitherto.

The invention will be better understood on reading the description which follows in which reference is made to the accompanying drawing in which the single figure shows, very diagrammatically, an atomic generator of atomic iodine in the fundamental state constructed according to the invention.

BRIEF DESCRIPTION OF THE DRAWING

The single FIGURE illustrates an atomic generator contructed and operated in accodance with the invention.

A combustion reaction capable of producing atomic iodine may be represented by the symbols:

where RI is a molecule transporting the iodine chemical species, I is atomic iodine, and P symbolizes the other combustion products, among which molecular iodine $I_2$ may be present; certain products may be more or less disturbing to the laser effect: in this case their production must be minimized by a better choice of the nature of the reaction products RI and A and of their relative proportions (one example of a troublesome product is solid carbon). In addition, it not excluded that the molecular A may also transport the iodine atom (example, $IF_5$).

A combustion may be considered as a disturbance of the thermodynamic equilibrium accompanied by a high heat reaction carrying the final products to high temperature; these products are then capable of being in the atomic state as a result of rupture phenomena of chemical bonds (disassociation). In this respect, any reaction of the type RI+A does not necessarily lead to the production of atomic iodine; it is necessary for this for the final temperature to be high enough to lead to the disassociation of the molecular iodine into atomic iodine. It is hence necessary to select starting compositions and to verify by theoretical calculation, from the heats of formation of the initial and final species (in a first step without thermal losses and in a second step with thermal losses), the actuality of the presumption of atomic iodine production.

In addition the formation of atomic iodine in the fundamental state requires the iodine compound participating in the combustion to be slightly in excess with respect to the stoichiometric proportions corresponding to the combustion reaction concerned.

The molecular complement of I in RI, namely R, is rather a combustion supporter, that is to say of an oxydizing nature, or rather a fuel, that is to say of a reducing nature. This classification is not absolute since the combustion-supporting or fuel nature depends on the pair of species; thus, by way of example, chlorine is a fuel with respect to fluorine and combustion-supporting with respect to hydrogen. This nonetheless permits series of chemical species to be shown which are capable of being used to obtain atomic iodine:

(a) Case of R with a combustion-supporting character
$IF_5$, $IF_7$ for fluorine;
$ICl$, $ICl_3$ for chlorine;
$IBr$, $IBr_3$ for bromine;
$I_2$ for iodine;
(b) Case of R with a combustible character:
HI for hydrogen;
$CHI_3$, $CI_4$ for hydrocarbons;
$CF_3I$, $C_3F_7I$ for fluorocarbons;
LiI, NaI, KI for metals;

The same criterion may be adapted for the molecule A:

(c) Case of fuel A:
$H_2$ for hydrogen;
$C_xH_y$ for hydrocarbons;
$C_xF_yH_z$ for fluorohydrocarbons;
$N_xH_y$ for amines;
$S_xH_y$ for sulfides;
(d) Case of fuel supporter A:
$ClF_3$, $ClF_5$; $IF_5$ for interhalogens $X_xY_y$;
$F_2$ for fluorine;
$NF_3$, $NF_4BF_4$, $(NF_4)_2NiF_6$ for the fluoramines $N_xF_y$;
$O_2$, $HNO_3$, $N_2O_4$, $H_2O_2$ for the oxygenators.

The physical state of each of the terms of this list is not specified. Thus, it would be possible to imagine an association of the solid propergol type for the pair $(NF_4)_2NiF_6+I_2$ or of the biliquid type for the pair $ClF_5+IF_5$. However, the case of gases is preferred for practical reasons of flow measurement.

According to the invention, only some of the above mentioned products are selected and the conditions of the processs are so adapted that only ground state atomic iodine is obtained.

The combustible supporter is selected from among $F_2$ and $NF_3$;

the fuel is selected from among $H\dot{I}$, $CF_3\dot{I}$, $C_3F_7\dot{I}$, $\dot{I}_2$ and $CH\dot{I}_3$;

the richness $\phi$ of the iodine compound with respect to the stoichiometric proportions of the corresponding combution reaction is $0.5<\phi<2.5$ by using the combustible supporter $F_2$ and $0.6<\phi<2.6$ by using the combustible supporter $NF_3$;

and the said combustion reaction is made under a pressure condition between 50 torrs and 5 bars.

For example, some of the combustion reactions are as follows:

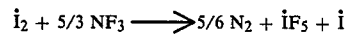

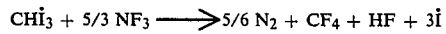

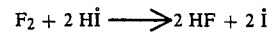

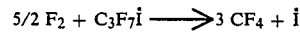

Features of the combustion reactions are mentioned in the following table:

TABLE

| Combustion supporter $F_2$ | Iodine fuel | Combustion supporter $NF_3$ (nitrogen trifluoride) |
|---|---|---|
| $0.5 < \phi < 2.2$ | HI | $0.6 < \phi < 2$ |
| $3.36 < m < 14.82$ | (hydriodic acid) | $3.24 < m < 10.81$ |
| $0.5 < \phi < 1.3$ | $CF_3I$ | $0.6 < \phi < 1.3$ |
| $5.15 < m < 13.41$ | (trifluoriodo-methane) | $4.96 < m < 10.77$ |
| $0.5 < \phi < 1.3$ | $C_3F_7I$ | $0.6 < \phi < 1.3$ |
| $1.56 < m < 4.06$ | (perfluoroiodopropane) | $1.50 < m < 3.25$ |
| $1.5 < \phi < 2.5$ | $I_2$ | $1.7 < \phi < 2.3$ |
| $10.02 < m < 16.71$ | (iodine) | $9.12 < m < 12.34$ |
| $0.6 < \phi < 1.3$ | $CHI_3$ | $0.8 < \phi < 1.2$ |
| $2.49 < m < 5.39$ | (iodoform) | $2.68 < m < 4$ | with $\phi$ = richness $$m = \frac{\text{fuel mass flow}}{\text{combustion supporter mass flow}}$$

and $\phi = \dfrac{m}{m_s}$ with $m_s$ = value of the coumpound ratio for a stoichiometric compound (full combustion, without remaining product).

The above data correspond to a pressure of 1 bar, but the pressure may be varied between 50 torrs and 5 bars without substantial modification of the ground state atomic iodine quantity.

The theoretical production level of atomic iodine is indicated below for some reactions given purely by way of example:

the combustion $F_5I+5H_2$ (richness 2) leads to formation of 11% atomic iodine;

the combustion $2I_2+F_2$ (richness 2) leads to the formation of 11% atomic iodine;

the combustion CI$_4$+4/5IF$_5$ (richness 1) leads to the formation of 51.6% of atomic iodine:

the combustion CHI$_3$+5/2F$_2$ (richness 1) leads to the formation of 45.8% of atomic iodine;

the combustion 2I$_2$+H$_2$ (richness 0.5) does not result in the formation of atomic iodine.

However, it must be noted that the ratios of atomic iodine formation is both a function of the richness and of the pressure. By way of example, the combustion C$_3$F$_7$I+NF$_3$ provides for a pressure of 1 bar, a maximum ratio of 17% atomic iodine for a richness of 1; the change in this ratio increases with richness, however with a production of solid carbon from a richness of 1.2. Under a pressure of 6 bars, the results are substantially identical. For this combustion, it is hence necessary to maintain the richness below 1.2 in order to avoid the formation of solid carbon which results in a disturbance of the operation of the equipment.

By way of second example, the combustion CF$_3$I+NF$_3$ provides, for a pressure of 1 bar, a maximum ratio of 43% atomic iodine for a richness (maximum) of 1; however, solid carbon appears from the richness 1. For a pressure of 6 bars, there is the formation of 39% of atomic iodine with the same remarks. It is hence advantageous to work with a richness a little below 1 in order to avoid the formation of solid carbon.

By way of a third example, the combustion HI+NF$_3$ provides, at the pressure of 1 bar, a ratio of atomic carbon of 49% for the maximum richness of 1.5, whilst at the pressure of 6 bars, the ratio is 48% for a maximum richness of 1.2.

The atomic iodine generator shown in the ingle figure comprises an enclosure 1 defining a combustion chamber into which opens an injection system for the introduction of fuel and of the combustion suporter. The injection system is of coaxial type, with central injection of the fuel and external injection of the combustion supporter. It comprises a male portion 3 provided with an axial bore 4 for the introduction of the fuel; this male portion extends into a cavity 5 of the enclosure, with the walls of which it defines an annular duct, communicating downwards with the chamber 2, for the introduction of the combustion supporter. The male portion 3 is axially moveable (for example by the bias of a threaded fastening) so as to be able to modify the aperture of the annular injector and hence the speed of injection of the combustion supporter. The regulation of the injection speed of the fuel is done by modification of the diameter of the inlet duct for the fuel, for example by the bias of adjustable throttles 6.

The supply circuit A of the combustion supporter comprises particularly a tank 7 for combustion supporter under pressure, a distributing valve 8, a reducing valve 9 and a regulating and measuring member 10 for the flow rate of the combustion supporter.

The supply circuit B for the fuel is constituted in the same manner and comprises particularly a reservoir 11 for fuel under pressure, a distributing valve 12, a reducing valve 13 and a regulating and measuring member 14 for the flow rate of the fuel, followed by the above-mentioned throttle 6.

If necessary, in the case where preheating of the chamber is necessary, there is added, to the fuel supply circuit, a supply circuit C for preheating fuel which comprises a reservoir 15 for preheating fuel, a distributing valve 16, a reducing valve 17, and a regulating and measuring member 18 for the flow rate of the auxiliary fuel, followed by a throttle 6' for regulating the speed of injection.

Taking into account the principle of thermal production of atomic iodine by combustion and the need to have it available at a temperature in the vicinity of ambiant temperature, it is necessary to have recourse to a set expansion (preservation of the iodine in its atomis form at the same time as rapid cooling) which is obtained through a supersonic nozzle 19 situated at the outlet of the combustion chamber, opposite the injection system.

The atomic iodine is then directed towards its site of use 20 without undergoing notable recombination. This may be, in the use envisaged more specifically here, a laser cavity in which the atomic iodine in the fundamental state is mixed with singlet oxygen.

The ignition means designed to initiate combustion, namely principal combustion (for example CF$_3$I+NF$_3$) or preheating combustion of the chamber (for example H$_2$+NF$_3$), may be of any suitable type, for example, hypergolic ignition by fluorine, ignition by a preheated plug, etc. In the example shown in the FIGURE, it is obtained by means of a sparkplug 21 screwed into the wall of the chamber 2.

In addition, it is possible to provide in the chamber detection means 22 (for example, thermocouple and/or pressure sensor) permitting the development of the combustion reaction to be checked.

As is self-evident and as emerges besides already from the foregoing, the invention is in no way limited to those of its types of applications and embodiments which have been more particularly envisaged; it encompasses, on the contrary, all modifications.

We claim:

1. A process for generating ground state atomic iodine which comprises subjecting to combustion under a pressure between 50 torrs and 5 bar a mixture of a combustion supporter selected from the group consisting of F$_2$ and NF$_3$ and at least one fuel selected from the group consisting of HI, CF$_3$I, C$_3$F$_7$I, I$_2$ and CH$_3$, the richness $\phi$ of the iodine compound with respect to the stoichiometric proportions is $0.5<\phi<2.5$ by using the combustible supporter F$_2$ and $0.6<\phi<2.6$ by using the combustible supporter NF$_3$.

2. Process according to claim 1, in which the combustible supporter is NF$_3$ and the fuel is HI with $0.6<\phi<2$ and $3.24<m<10.81$ in which $\phi$ is the richness and m is the ratio of the compound mass flows.

3. Process according to claim 1, in which the combustible supporter is NF$_3$ and the fuel is CF$_3$I with $0.6<\phi<1.3$ and $4.96<m<10.77$.

4. Process according to claim 1, in which the combustible supporter is NF$_3$ and the fuel is C$_3$F$_7$I with $0.6<\phi<1.3$ and $1.50<m<3.25$.

5. Process according to claim 1, in which the combustible supporter in NF$_3$ and the fuel is I$_2$ with $1.7<\phi<2.3$ and $9.12<12.34$.

6. Process according to claim 1, in which the combustible supporter is NF$_3$ and the fuel is CHI$_3$ with $0.8<\phi<1.2$ and $2.66<m<4$.

7. Process according to claim 1, in which the combustible supporter is F$_2$ and the fuel is HI with $0.5<\phi<2.2$ and $3.36<m<14.82$.

8. Process according to claim 1, in which the combustible supporter is F$_2$ and the fuel is CF$_3$I with $0.5<\phi<1.3$ and $5.15<m<13.41$.

9. Process according to claim 1, in which the combustible supporter is F$_2$ and the fuel is C$_3$F$_7$I with $0.5<\phi<1.3$ and $1.56<m<4.06$.

10. Process according to claim 1, in which the combustible supporter is F$_2$ and the fuel is I$_2$ with $1.5<\phi<2.5$ and $10.02<m<16.71$.

11. Process according to claim 1, in which the combustible supporter is F$_2$ and the fuel is CHI$_3$ with $0.6<\phi<1.3$ and $2.49<m<5.39$.

* * * * *